United States Patent
Chen et al.

(10) Patent No.: US 12,279,078 B2
(45) Date of Patent: Apr. 15, 2025

(54) PROJECTION APPARATUS

(71) Applicant: Coretronic Corporation, Hsin-Chu (TW)

(72) Inventors: Shang-Wei Chen, Hsin-Chu (TW); Ming-Tsung Weng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 18/389,799

(22) Filed: Dec. 20, 2023

(65) Prior Publication Data

US 2024/0214530 A1  Jun. 27, 2024

(30) Foreign Application Priority Data

Dec. 21, 2022 (CN) .......................... 202211649662.2

(51) Int. Cl.
*H04N 9/31* (2006.01)

(52) U.S. Cl.
CPC ......... *H04N 9/3152* (2013.01); *H04N 9/3105* (2013.01); *H04N 9/3155* (2013.01); *H04N 9/3158* (2013.01); *H04N 9/3164* (2013.01)

(58) Field of Classification Search
CPC .. H04N 9/3158; H04N 9/3105; H04N 9/3152; H04N 9/3164; H04N 9/3155; H04N 9/31; G03B 21/204; G03B 21/2066; G03B 21/208; G03B 21/005; G02B 27/141
USPC .... 348/744, 750, 752, 755–757; 353/31, 33, 353/81, 98, 99
See application file for complete search history.

(56) References Cited

U.S. PATENT DOCUMENTS 10,110,861 B2  10/2018 Li et al.
2023/0224438 A1*  7/2023 Gong ................. G03B 21/2066
  348/750

FOREIGN PATENT DOCUMENTS

| CN | 104216210 | 1/2017 |
| CN | 109521633 | 3/2019 |
| CN | 211826877 | 10/2020 |
| CN | 109634041 | 12/2020 |
| CN | 112241101 | 1/2021 |
| CN | 110855960 | 12/2021 |
| EP | 2902844 | 12/2018 |

* cited by examiner

*Primary Examiner* — Sherrie Hsia
(74) *Attorney, Agent, or Firm* — JCIPRNET

(57) ABSTRACT

A projection apparatus includes an illumination system, a prism assembly, a first light valve, a second light valve and a projection lens. The illumination system includes a blue light emitting element, a red light emitting element, a wavelength conversion device, a dichroic assembly, a first light diffusing element and a second light diffusing element. The second light diffusing element has a diffusion area and a non-diffusion area. The diffusion area is located on a transmission path of a blue beam from the dichroic assembly, and the non-diffusion area is located on a transmission path of a green beam from the dichroic assembly. The prism assembly has a dichroic film. The dichroic film is configured to transmit a red beam to the first light valve. The dichroic film is configured to transmit the green beam and the blue beam to the second light valve.

18 Claims, 6 Drawing Sheets

PROJECTION APPARATUS

CROSS-REFERENCE TO RELATED APPLICATION

This application claims the priority benefit of China application serial no. 202211649662.2, filed on Dec. 21, 2022. The entirety of the above-mentioned patent application is hereby incorporated by reference herein and made a part of this specification.

BACKGROUND

Technical Field

The disclosure relates to an optical device, and in particular to a projection apparatus.

Description of Related Art

With the advancement of display technology, a user's requirement for a projection apparatus is getting higher and higher. For example, the user hopes that the brightness of an image that the projection apparatus can provide will be higher and higher. In this way, when the projection apparatus is in the use, the environment does not need to be limited to low brightness.

One of the essential elements of the projection apparatus is a light valve, which is configured to convert an illumination beam into an image beam. However, when the brightness of the image is getting higher and higher, if a single light valve is used, the light energy transmitted on the light valve will be too high, and cause the temperature of the light valve to exceed the normal operating temperature, thereby causing the projection apparatus to fail to operate normally.

In order to improve the brightness of the image, a projection apparatus uses a laser beam to be emitted to yellow phosphor to produce a desired color and high-brightness beam. However, the conversion efficiency of the yellow phosphor is poor. Moreover, since the red light converted from the yellow phosphor has poor saturation, the color gamut of the image is limited.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure provides a projection apparatus, which may achieve the effects of higher brightness, wider color gamut and higher wavelength conversion efficiency.

Other objectives and advantages of the disclosure may be further understood from the technical features disclosed in the disclosure.

In order to achieve one or part or all of the above objectives or other objectives, an embodiment of the disclosure proposes a projection apparatus. The projection apparatus includes an illumination system, a prism assembly, a first light valve, a second light valve and a projection lens. The illumination system includes a blue light emitting element, a red light emitting element, a wavelength conversion device, a dichroic assembly, a first light diffusing element and a second light diffusing element. The blue light emitting element is configured to emit a blue beam, and the red light emitting element is configured to emit a red beam. The wavelength conversion device includes a reflection area and a wavelength conversion area, the reflection area and the wavelength conversion area are located on a transmission path of the blue beam in time sequence, and the wavelength conversion area is configured to convert the blue beam into a green beam. The dichroic assembly is disposed between the blue light emitting element and the wavelength conversion device. The first light diffusing element is disposed between the red light emitting element and the dichroic assembly. The second light diffusing element is disposed on transmission paths of the blue beam, the red beam and the green beam from the dichroic assembly, and the second light diffusing element has a diffusion area and a non-diffusion area. An angle of the non-diffusion area relative to a central axis of the second light diffusing element is greater than an angle of the diffusion area relative to the central axis of the second light diffusing element, the diffusion area is located on a transmission path of the blue beam, and the non-diffusion area is located on a transmission path of the green beam. A prism assembly is disposed on transmission paths of the red beam, the green beam and the blue beam from the second light diffusing element, and has a dichroic film. The dichroic film is configured to transmit the red beam to the first light valve, and the first light valve is configured to convert the red beam into a first image beam. The dichroic film is configured to transmit the green beam and the blue beam to the second light valve, and the second light valve is configured to convert the green beam and the blue beam into a second image beam and a third image beam. The projection lens is disposed on a transmission path of an image beam, and configured to project the image beam out of the projection apparatus, and the image beam includes at least one of the first image beam, the second image beam and the third image beam.

In an embodiment of the disclosure, an angle coverage of the wavelength conversion area relative to a central axis of the wavelength conversion device is 270 degrees to 306 degrees.

In an embodiment of the disclosure, the dichroic assembly includes a first dichroic element and a second dichroic element, and the first dichroic element is disposed between the second dichroic element and the wavelength conversion device.

In an embodiment of the disclosure, the first dichroic element has a first area, a second area and a third area arranged in sequence, coating properties of the first area are the same as coating properties of the third area, and the coating properties of the first area are different from coating properties of the second area.

In an embodiment of the disclosure, the first area and the third area are configured to allow the blue beam and the red beam to pass through and reflect the green beam, the second area is configured to allow the red beam to pass through and reflect the blue beam and the green beam, the second area and the third area are located on a transmission path of the blue beam from the reflection area of the wavelength conversion device, and an area ratio between the second area and the third area is 1:1.

In an embodiment of the disclosure, the second dichroic element is configured to allow the red beam to pass through and reflect the blue beam.

In an embodiment of the disclosure, the red beam emitted by the red light emitting element is transmitted to the first light diffusing element, the second dichroic element, the first dichroic element and the second light diffusing element in sequence.

In an embodiment of the disclosure, the red beam passes through the diffusion area and the non-diffusion area of the second light diffusing element in time sequence.

In an embodiment of the disclosure, the first light diffusing element has a diffusion area.

In an embodiment of the disclosure, a sum of the angle of the diffusion area relative to the central axis of the second light diffusing element and the angle of the non-diffusion area relative to the central axis of the second light diffusing element is 360 degrees.

In an embodiment of the disclosure, the non-diffusion area includes a reflection layer, which is configured to reflect the blue beam.

In an embodiment of the disclosure, in a first time interval, the green beam passes through the non-diffusion area of the second light diffusing element, and in a second time interval, the blue beam passes through the diffusion area of the second light diffusing element.

In an embodiment of the disclosure, in the first time interval, the red beam and the green beam are transmitted to the first light valve and the second light valve respectively, and in the second time interval, the red beam and the blue beam are transmitted to the first light valve and the second light valve respectively.

In an embodiment of the disclosure, a ratio between the first time interval and the second time interval is 75:25 to 85:15.

In an embodiment of the disclosure, a time length of the red beam entering the first light valve is equal to a sum of a time length of the green beam entering the second light valve and a time length of the blue beam entering the second light valve.

In an embodiment of the disclosure, the dichroic film is configured to allow the red beam to pass through and be transmitted to the first light valve, and is configured to reflect the green beam and the blue beam to the second light valve.

In an embodiment of the disclosure, a peak of a spectrum of the green beam falls within a range of 515 nanometers (nm) to 535 nm.

In an embodiment of the disclosure, a reflection band of the blue beam reflected by the non-diffusion area includes a range of 450 nm to 460 nm.

Based on the aforementioned, embodiments of the disclosure have at least one of the following advantages or effects. In the projection apparatus of the embodiment of the disclosure, since the wavelength conversion device that converts the blue beam into the green beam is used, the projection apparatus of the embodiment of the disclosure may have higher wavelength conversion efficiency, thus, the effect of higher brightness may be achieved. Moreover, because the red beam in the disclosure all comes from the red light emitting element, the saturation of the red beam is relatively high, therefore, the illumination system and the projection apparatus of the embodiment of the disclosure may have a wider color gamut. In the embodiment of the disclosure, the red beam enters the first light valve, and the green beam and the blue beam enter the second light valve. The loading of light energy withstood by the first light valve and the second light valve is not too high, so the temperature of the projection apparatus is not too high. As a result, the projection apparatus of the embodiment of the disclosure may operate normally and has good image quality.

Other objectives, features and advantages of the present disclosure will be further understood from the further technological features disclosed by the embodiments of the present disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the present disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
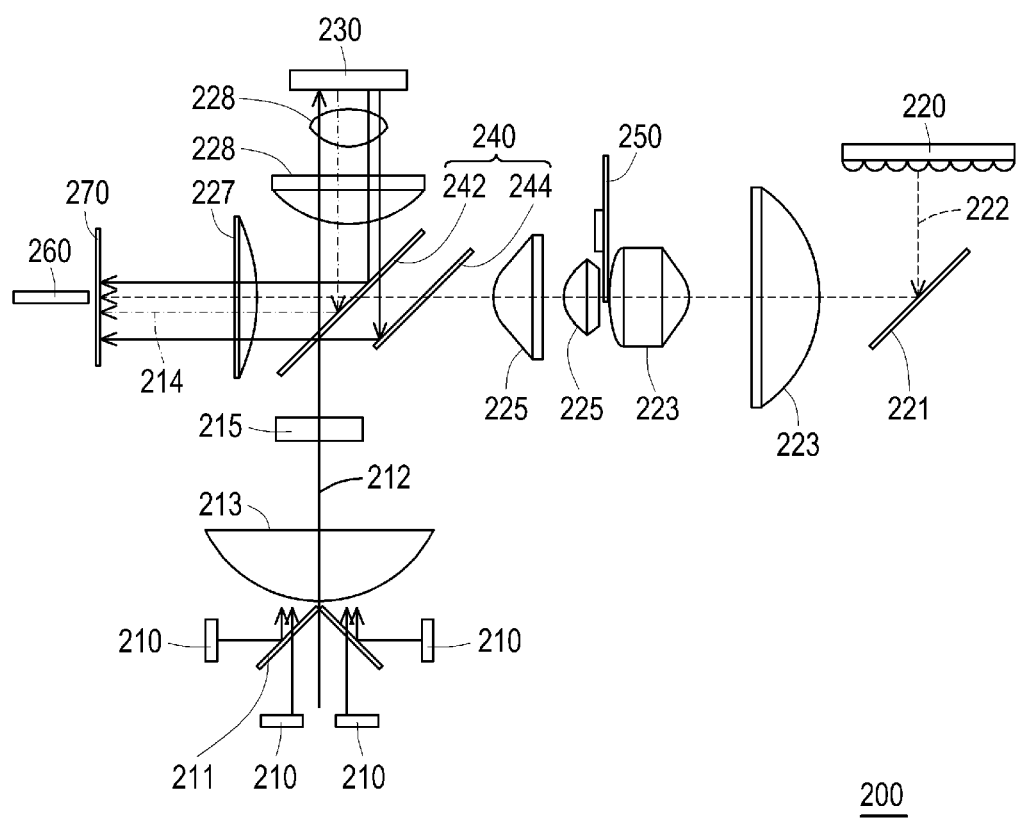
FIG. 1 is a schematic structural diagram of an illumination system according to an embodiment of the disclosure.
Figure 2:
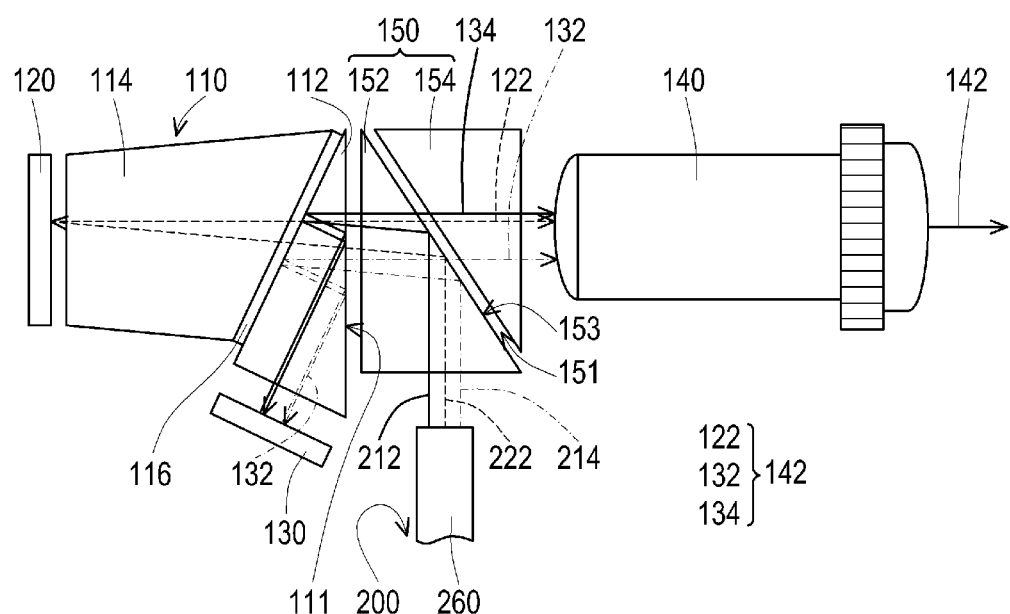
FIG. 2 is a schematic diagram of a projection apparatus according to an embodiment of the disclosure.

FIG. 1 is a schematic structural diagram of an illumination system according to an embodiment of the disclosure, and FIG. 2 is a schematic diagram of a projection apparatus according to an embodiment of the disclosure. An illumination system 200 in FIG. 2 is the illumination system 200 in FIG. 1. Referring to FIGS. 1 and 2, a projection apparatus (projector) 100 of the embodiment includes the illumination system 200, a prism assembly 110, a first light valve 120, a second light valve 130 and a projection lens 140. The illumination system 200 includes at least one blue light emitting element 210 (multiple blue light emitting elements 210 are taken as an example in FIG. 1), at least one red light emitting element 220, a wavelength conversion device 230, a dichroic assembly 240, a first light diffusing element 250 and a second light diffusing element 270.

The blue light emitting element 210 is configured to emit a blue beam 212, and the red light emitting element 220 is configured to emit a red beam 222. In the embodiment, the at least one blue light emitting element 210 and the at least one red light emitting element 220 are, for example, light-emitting diodes (LEDs), laser diodes (LDs) or combinations thereof, or other suitable light sources. In an embodiment, the illumination system 200 may further include a reflection mirror 211, a lens 213, a fly eye lens 215, a reflection mirror 221 and lenses 223. The blue beams 212 emitted by the blue light emitting elements 210 may be transmitted to the wavelength conversion device 230 by the reflection mirror 211, the lens 213 and the fly eye lens 215. The red beams 222 emitted by the red light emitting elements 220 may be transmitted to the first light diffusing element 250 by the reflection mirror 221 and the lenses 223.

Figure 3:
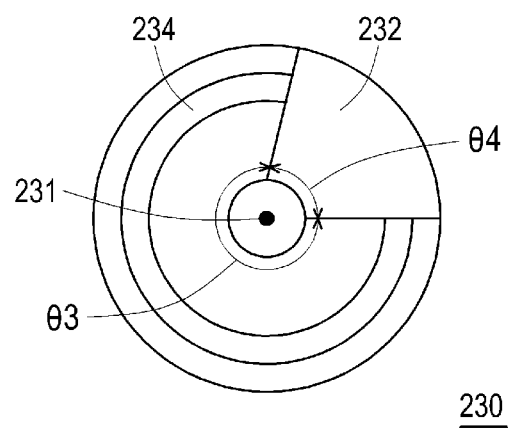
FIG. 3 is a schematic front view of the wavelength conversion device in FIG. 1.

FIG. 3 is a schematic front view of the wavelength conversion device in FIG. 1. Referring to FIGS. 1, 2 and 3, the wavelength conversion device 230 includes a reflection area 232 and a wavelength conversion area 234, and the reflection area 232 and the wavelength conversion area 234 are located on the transmission path of the blue beam 212 in time sequence. The wavelength conversion area 234 is configured to convert the blue beam 212 into a green beam 214. In the embodiment, the wavelength conversion device 230 is, for example, a rotating wheel, and the wavelength conversion area 234 is coated with green phosphor. When the wavelength conversion area 234 moves to the transmission path of the blue beam 212 due to the rotation of the rotating wheel, the blue beam 212 excites the green phosphor, and the green phosphor produces the green beam 214. The peak of the spectrum of the green beam 214 ranges from 515 nanometers (nm) to 535 nm, for example. When the reflection area 232 moves to the transmission path of the blue beam 212 due to the rotation of the rotating wheel, the reflection area 232 reflects the blue beam 212. The reflection area 232 includes, for example, a reflection mirror or a reflection layer.

The dichroic assembly 240 is disposed between the blue light emitting element 210 and the wavelength conversion device 230. The first light diffusing element 250 is disposed between the red light emitting element 220 and the dichroic assembly 240. The second light diffusing element 270 is disposed on the transmission paths of the blue beam 212, the red beam 222 and the green beam 214 from the dichroic assembly 240. In an embodiment, the illumination system 200 further includes a light uniforming element 260, and the second light diffusing element 270 is disposed between the dichroic assembly 240 and the light uniforming element 260.

Figure 4:
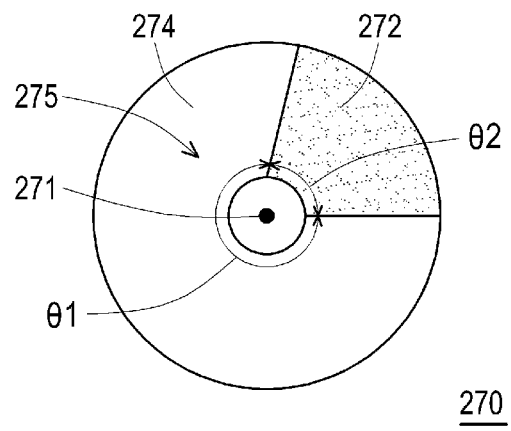
FIG. 4 is a schematic front view of the second light diffusing element in FIG. 1.

FIG. 4 is a schematic front view of the second light diffusing element in FIG. 1. Referring to FIGS. 1 to 4, the second light diffusing element 270 has a diffusion area 272 and a non-diffusion area 274. An angle θ1 of the non-diffusion area 274 relative to a central axis 271 of the second light diffusing element 270 is greater than an angle θ2 of the diffusion area 272 relative to the central axis 271 of the second light diffusing element 270, the diffusion area 272 is located on the transmission path of the blue beam 212, and the non-diffusion area 274 is located on the transmission path of the green beam 214. In the embodiment, the second light diffusing element 270 is a rotating wheel, and the sum of the angle θ2 of the diffusion area 272 relative to the central axis 271 of the second light diffusing element 270 and the angle θ1 of the non-diffusion area 274 relative to the central axis 271 of the second light diffusing element 270 is 360 degrees. In the embodiment, the angle θ2 of the diffusion area 272 relative to the central axis 271 of the second light diffusing element 270 is equal to an angle θ4 of the reflection area 232 relative to a central axis 231 of the wavelength conversion device 230, and the angle θ1 of the non-diffusion area 274 relative to the central axis 271 of the second light diffusing element 270 is equal to an angle θ3 of the wavelength conversion area 234 relative to the central axis 231 of the wavelength conversion device 230. When the reflection area 232 moves to the transmission path of the blue beam 212 and reflects the blue beam 212, the diffusion area 272 moves to the transmission path of the blue beam 212 reflected from the reflection area 232, and A haze value of the diffusion area 272 is greater than 0 and the diffusion region 272 is configured to diffuse the blue beam 212 and the speckle phenomenon may be suppressed. When the wavelength conversion area 234 moves to the transmission path of the blue beam 212 and converts the blue beam 212 into the green beam 214, the non-diffusion area 274 enters the transmission path of the green beam 214, and the non-diffusion are 274 has no haze and is configured to allow the green beam 214 to pass through.

In the embodiment, the angle coverage of the wavelength conversion area 234 relative to the central axis 231 of the wavelength conversion device 230 (that is, the range of the size of the angle θ3) is 270 degrees to 306 degrees, or the range is 279 degrees to 296 degrees. The angle coverage of the reflection area 232 relative to the central axis 231 of the wavelength conversion device 230 (that is, the range of the size of the angle θ4) is 54 degrees to 90 degrees, or the range is 64 degrees to 81 degrees. The angle coverage of the non-diffusion area 274 relative to the central axis 271 of the second light diffusing element 270 (that is, the range of the size of the angle θ1) is 270 degrees to 306 degrees, or the range is 279 degrees to 296 degrees. The angle coverage of the diffusion area 272 relative to the central axis 271 of the second light diffusing element 270 (that is, the range of the size of the angle θ2) is 54 degrees to 90 degrees, or the range is 64 degrees to 81 degrees.

Figure 5:
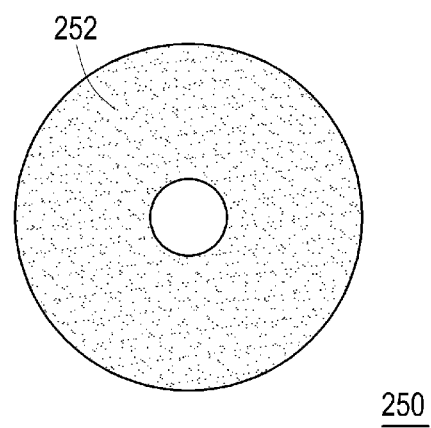
FIG. 5 is a schematic front view of the first light diffusing element in FIG. 1.

FIG. 5 is a schematic front view of the first light diffusing element in FIG. 1. Referring to FIGS. 1, 2 and 5, in the embodiment, the first light diffusing element 250 has a diffusion area 252. The diffusion area 252 has haze, and is configured to diffuse the red beam 222 to suppress a speckle phenomenon. In the embodiment, the first light diffusing element 250 is a rotating wheel, and the diffusion area 252 is in an annular shape. Due to being in an annular shape, the diffusion area 252 has the advantage of simple manufacturing process. In another embodiment, the first light diffusing element 250 may also be a fixed (that is, neither rotating nor moving) diffusing sheet. Due to being in the shape of a sheet, the diffusion area 252 has the advantage of simple manufacturing process.

In an embodiment, the light uniforming element 260 is, for example, a light integration rod, which is configured to uniformize the red beam 222, the green beam 214 and the blue beam 212. In other embodiments, the light uniforming element 260 may also be a lens array.

The prism assembly 110 is disposed on the transmission paths of the red beam 222, the green beam 214 and the blue beam 212 from the second light diffusing element 270, and the prism assembly 110 has a dichroic film 116. The dichroic film 116 is configured to transmit the red beam 222 to the first light valve 120, and the first light valve 120 is configured to convert the red beam 222 into a first image beam 122. The dichroic film 116 is configured to transmit the green beam 214 and the blue beam 212 to the second light valve 130, and the second light valve 130 is configured to convert the green beam 214 and the blue beam 212 into a second image beam 132 and a third image beam 134 respectively. The projection lens 140 is disposed on the transmission path of an image beam 142, and is configured to project the image beam 142 out of the projection apparatus 100 to form a projection beam projected onto a projection target (not shown), such as a screen or a wall, thereby forming an image on the projection target. The image beam 142 includes at least one of the first image beam 122, the second image beam 132 and the third image beam 134.

In the embodiment, the projection lens 140 is, for example, a combination of one or more optical lenses with refractive power. The optical lenses include, for example, various combinations of non-planar lenses such as biconcave lenses, biconvex lenses, concave-convex lenses, convex-concave lenses, plano-convex lenses and plano-concave lenses.

In the embodiment, the first light valve 120 and the second light valve 130 are, for example, digital micro-mirror devices (DMDs). In other embodiments, the first light valve 120 and the second light valve 130 may also be liquid-crystal-on-silicon panels (LCOS panels). In the embodiment, the prism assembly 110 further has a prism 112 and a prism 114, and the dichroic film 116 is disposed between the prism 112 and the prism 114.

In an embodiment, the red beam 222, the green beam 214 and the blue beam 212 uniformized from the light uniforming element 260 are first transmitted to a total internal reflection prism 150, and the total internal reflection prism 150 includes a prism 152 and a prism 154. An air gap 151 exists between the prism 152 and the prism 154, and a surface 153 of the prism 152 facing the air gap 151 is a total internal reflection surface. After entering the prism 152, the red beam 222, the green beam 214 and the blue beam 212 are totally reflected by the surface 153 to the prism assembly 110. In the embodiment, the dichroic film 116 is configured to allow the red beam 222 to pass through and be transmitted to the first light valve 120, and is configured to reflect the green beam 214 and the blue beam 212 to the second light valve 130. Specifically, after the red beam 222, the green beam 214 and the blue beam 212 are totally reflected by the surface 153 to the prism assembly 110, the red beam 222 passes through the prism 112, the dichroic film 116 and the prism 114 in sequence and is transmitted to the first light valve 120. The first image beam 122 converted by the first light valve 120 passes through the prism 114, the dichroic film 116, the prism 112, the prism 152, the air gap 151 and the prism 154 in sequence and is transmitted to the projection lens 140. After entering the prism 112, the green beam 214 and the blue beam 212 are reflected by the dichroic film 116, reflected by a surface 111 of the prism 112 and transmitted to the second light valve 130 in sequence. The second image beam 132 and the third image beam 134 converted by the second light valve 130 enter the prism 112, are reflected by the surface 111 and reflected by the dichroic film 116 in sequence, then pass through the surface 111, the prism 152, the air gap 151 and the prism 154 in sequence, and are transmitted to the projection lens 140. That is, the dichroic film 116 is adapted for allowing red light (the red beam 222 and the first image beam 122) to pass through, and the dichroic film 116 is adapted for reflecting green light (the green beam 214 and the second image beam 132) and blue light (the blue beam 212 and the third image beam 134).

In an embodiment, the dichroic film 116 with other coating properties may be selected. For example, the dichroic film 116 is adapted for allowing green light (the green beam 214 and the second image beam 132) and blue light (the blue beam 212 and the third image beam 134) to pass through, and adapted for reflecting red light (the red beam 222 and the first image beam 122).

In the illumination system 200 and the projection apparatus 100 of the embodiment, since the wavelength conversion device 230 that converts the blue beam 212 into the green beam 214 is used, the illumination system 200 and the projection apparatus 100 of the embodiment may have higher wavelength conversion efficiency. The wavelength conversion device 230 of the embodiment uses the green phosphor, and the wavelength conversion efficiency of the green phosphor is greater than the wavelength conversion efficiency of the yellow phosphor, so the conversion efficiency of converting the blue beam 212 into the green beam 214 may be effectively improved, thereby achieving higher brightness. For example, the projection apparatus 100 of the embodiment may achieve the brightness as high as 40,000 lumens, and when the brightness is above 30,000 lumens, the luminous power of the blue light emitting element 210 may be reduced by 5% and more, thereby effectively saving energy. Since the red beam 222 of the embodiment all comes from the red light emitting element 220 instead of being produced by the yellow phosphor, the red beam 222 of the embodiment has higher color purity and may have a wider color gamut. The BT.2020 color gamut may reach 67.5% (which is 4% to 5% more than the 63% that may be achieved by the red light of less saturation produced by using the yellow phosphor).

In the embodiment, the dichroic assembly 240 includes a first dichroic element 242 and a second dichroic element 244, and the first dichroic element 242 is disposed between the second dichroic element 244 and the wavelength conversion device 230.

Figure 6:
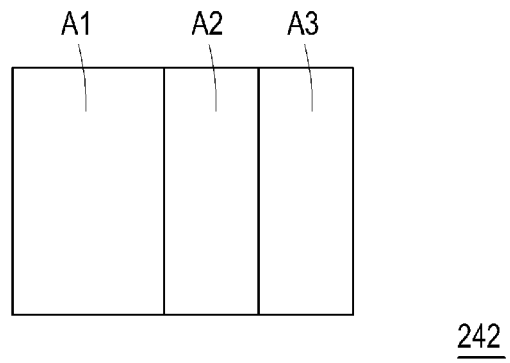
FIG. 6 is a schematic front view of the first dichroic element in FIG. 1.
Figure 7:
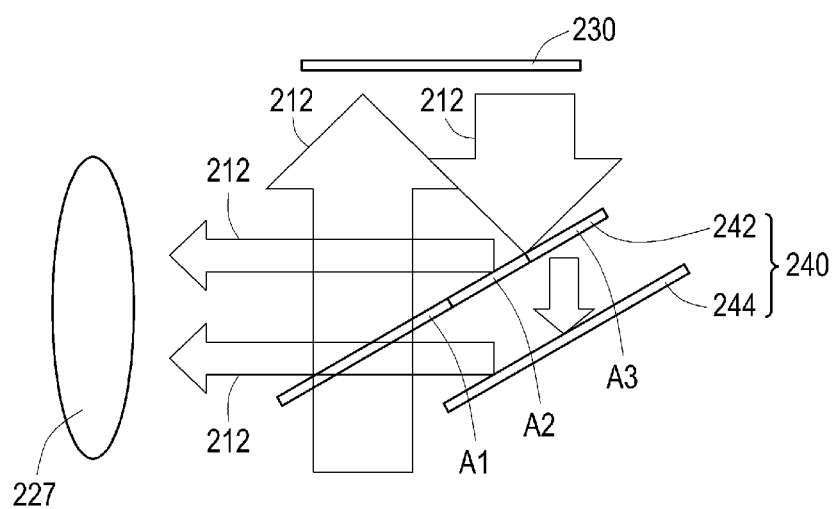
FIG. 7 is a schematic diagram of the dichroic assembly, the wavelength conversion device and the lens in FIG. 1.

FIG. 6 is a schematic front view of the first dichroic element in FIG. 1, and FIG. 7 is a schematic diagram of the dichroic assembly, the wavelength conversion device and the lens in FIG. 1. Referring to FIGS. 1, 6 and 7, the first dichroic element 242 has a first area A1, a second area A2 and a third area A3 arranged in sequence, and the first dichroic element 242 is coated with a dichroic film on the surfaces of the first area A1, the second area A2 and the third area A3. The coating properties of the first area A1 are the same as the coating properties of the third area A3, and the coating properties of the first area A1 are different from the coating properties of the second area A2. The first dichroic element 242 is, for example, a beam splitter.

Specifically, the first area A1 and the third area A3 are configured to allow the blue beam 212 and the red beam 222 to pass through and reflect the green beam 214, and the second area A2 is configured to allow the red beam 222 to pass through and reflect the blue beam 212 and the green beam 214. The first area A1 is located on the transmission path of the blue beam 212 from the blue light emitting element 210, and the second area A2 and the third area A3 are located on the transmission paths of the blue beam 212 and the green beam 214 from the wavelength conversion device 230. FIG. 7 is a schematic diagram of the time when the dichroic assembly 240 acts on the blue beam 212. In an embodiment, the area ratio between the second area A2 and the third area A3 is 1:1. Because the second area A2 is configured to reflect the blue beam 212, and the third area A3 is configured to allow the blue beam 212 to pass through, in this way, the effect of uniform distribution of the blue beam 212 may be achieved. In addition, the second dichroic element 244 is configured to allow the red beam 222 to pass through and reflect the blue beam 212. The second dichroic element 244 is, for example, a beam splitter.

In the embodiment, the red beam 222 emitted by the red light emitting element 220 is transmitted to the first light diffusing element 250, the second dichroic element 244, the first dichroic element 242 and the second light diffusing element 270 in sequence. In addition, the red beam 222 passes through the non-diffusion area 274 of the second light diffusing element 270. In the embodiment, the non-diffusion area 274 may include a reflection layer 275, which is configured to reflect the blue beam 212 that is not converted by the wavelength conversion area 234 and configured to allow the red beam 222 and the green beam 214 to pass through, so as to avoid causing a speckle phenomenon and prevent stray light from entering a subsequent optical element (such as the light uniforming element 260). In an embodiment, the reflection band of the reflection layer 275 of the non-diffusion area 274 configured to reflect the blue beam 212 includes, for example, a range of 450 nm to 460 nm.

Figure 8:
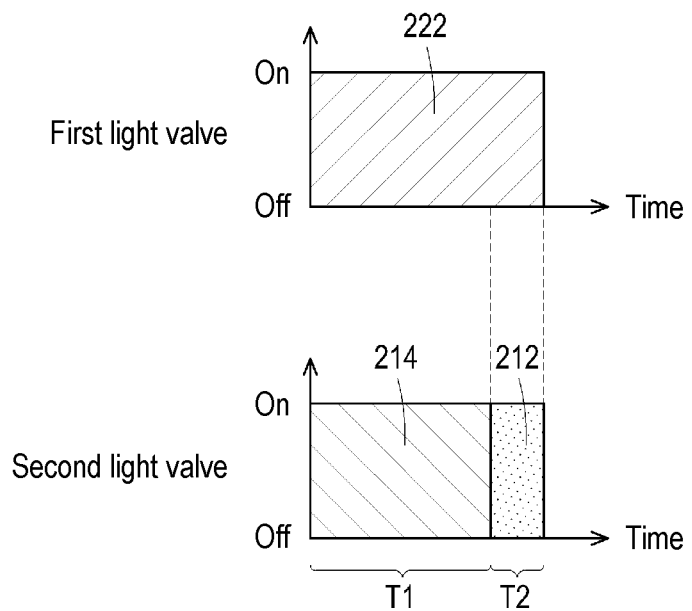
FIG. 8 is a timing diagram of the first light valve and the second light valve in FIG. 2.

FIG. 8 is a timing diagram of the first light valve and the second light valve in FIG. 2. Referring to FIGS. 1, 2 and 8, in the embodiment, in a first time interval T1, the green beam 214 passes through the non-diffusion area 274 of the second light diffusing element 270, and in a second time interval T2, the blue beam 212 passes through the diffusion area 272 of the second light diffusing element 270. In addition, in the embodiment, the red beam 222 passes through the diffusion area 272 and the non-diffusion area 274 of the second light diffusing element 270 in time sequence. That is, in the first time interval T1, the red beam 222 passes through the non-diffusion area 274 of the second light diffusing element 270, and in the second time interval T2, the red beam 222 passes through the diffusion area 272 of the second light diffusing element 270.

In the embodiment, in the first time interval T1, the red beam 222 and the green beam 214 are transmitted to the first light valve 120 and the second light valve 130 respectively, and in the second time interval T2, the red beam 222 and the blue beam 212 are transmitted to the first light valve 120 and the second light valve 130 respectively. In an embodiment, the ratio between the first time interval T1 and the second time interval T2 is 75:25 to 85:15, or 77:23 to 83:17, and the first time interval T1 and the second time interval T2 do not overlap. In the embodiment, no matter in the first time interval T1 or the second time interval T2, the blue light emitting element 210 and the red light emitting element 220 are continuously turned on, that is, the blue beam 212 and the red beam 222 are continuously emitted. In the embodiment, the time length of the red beam 222 entering the first light valve 120 is equal to the sum of the time length of the green beam 214 entering the second light valve 130 and the time length of the blue beam 212 entering the second light valve 130.

In the first time interval T1, the blue beam 212 emitted by the blue light emitting element 210 sequentially passes through the first area A1 of the first dichroic element 242 and the lens 228, is transmitted to the wavelength conversion area 234 of the wavelength conversion device 230, and is converted into the green beam 214 by the wavelength conversion area 234. The green beam 214 sequentially passes through the lens 228, is reflected by the second area A2 and the third area A3 of the first dichroic element 242, passes through the lens 227, passes through the non-diffusion area 274 of the second light diffusing element 270, passes through the light uniforming element 260 and is transmitted to the second light valve 130. In the first time interval T1, the red beam 222 emitted by the red light emitting element 210 sequentially passes through the first light diffusing element 250, the second dichroic element 244, the first dichroic element 242, the lens 227, the non-diffusion area 274 of the second light diffusing element 270 and the light uniforming element 260, and is transmitted to the first light valve 120.

In the second time interval T2, the blue beam 212 emitted by the blue light emitting element 210 sequentially passes through the first area A1 of the first dichroic element 242 and the lens 228, is transmitted to the reflection area 232 of the wavelength conversion device 230, and is reflected by the reflection area 232. A part of the blue beam 212 reflected by the reflection area 232 is reflected by the second area A2 of the first dichroic element 242 to the lens 227, and another part of the blue beam 212 reflected by the reflection area 232 sequentially passes through the third area A3 of the first dichroic element 242, is reflected by the second dichroic element 244, passes through the first area A1 of the first dichroic element 242 and is transmitted to the lens 227. Next, the blue beam 212 passes through the lens 227, the diffusion area 272 of the second light diffusing element 270 and the light uniforming element 260 in sequence, and is transmitted to the second light valve 130.

On the other hand, in the second time interval T2, the red beam 222 emitted by the red light emitting element 210 sequentially passes through the first light diffusing element 250, the second dichroic element 244, the first dichroic element 242, the lens 227, the diffusion area 272 of the second light diffusing element 270 and the light uniforming element 260, and is transmitted to the first light valve 120.

Figure 9:
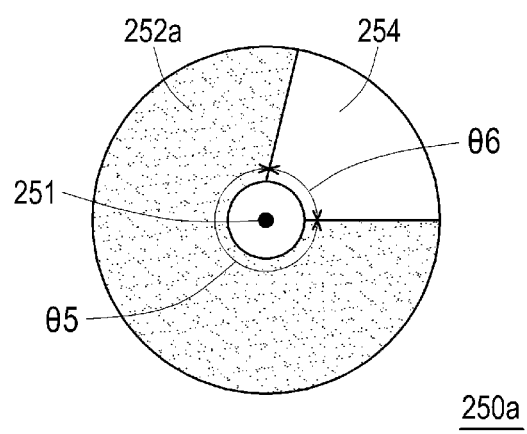
FIG. 9 is a schematic front view of the first light diffusing element according to another embodiment of the disclosure.

FIG. 9 is a schematic front view of the first light diffusing element of the illumination system according to another embodiment of the disclosure. Referring to FIGS. 1, 5 and 9, the difference between a first light diffusing element 250a of the embodiment and the first light diffusing element 250 of FIG. 5 lies in that the first light diffusing element 250a of the embodiment has a diffusion area 252a and a non-diffusion area 254, and an angle θ5 of the diffusion area 252a of the first light diffusing element 250a relative to a central axis 251 of the first light diffusing element 250a is equal to the angle θ3 of the wavelength conversion area 234 relative to the central axis 231 of the wavelength conversion device 230. An angle θ6 of the non-diffusion area 254 of the first light diffusing element 250a relative to the central axis 251 of the first light diffusing element 250a is equal to the angle θ4 of the reflection area 232 relative to the central axis 231 of the wavelength conversion device 230. The angle coverage of the diffusion area 252a relative to the central axis 251 of the first light diffusing element 250a (that is, the range of the size of the angle θ5) is 270 degrees to 306 degrees, or the range is 279 degrees to 296 degrees. The angle coverage of the non-diffusion area 254 relative to the central axis 251 of the first light diffusing element 250a (that is, the range of the size of the angle θ6) is 54 degrees to 90 degrees, or the range is 64 degrees to 81 degrees. In addition, in the first time interval T1, the diffusion area 252a moves to the transmission path of the red beam 222 to diffuse the red beam 222. In the second time interval T2, although the non-diffusion area 254 of the first light diffusing element 250a enters the transmission path of the red beam 222, the diffusion area 272 of the second light diffusing element 270 enters the transmission path of the red beam 222. Therefore, the red beam 222 may still be diffused by the diffusion area 272 of the second light diffusing element 270 and the effect of suppressing speckle may be achieved.

In summary, the embodiments of the disclosure have at least one of the following advantages or effects. In the illumination system and the projection apparatus of the embodiment of the disclosure, since the wavelength conversion device that converts the blue beam into the green beam is used, the illumination system and the projection apparatus of the embodiment of the disclosure may have higher wavelength conversion efficiency, thus, the effect of higher brightness may be achieved. Moreover, because the red beam in the disclosure all comes from the red light emitting element, the saturation of the red beam is relatively high, therefore, the illumination system and the projection apparatus of the embodiment of the disclosure may have a wider color gamut. In addition, in the embodiment of the disclosure, the red beam and the blue beam enter the first light valve, and the green beam enters the second light valve. The loading of light energy withstood by the first light valve and the second light valve is not too high, so the temperature of the projection apparatus is not too high. As a result, the projection apparatus of the embodiment of the disclosure may operate normally and has good image quality.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the present disclosure as defined by the following claims. Moreover, no element and component in the present disclosure is intended to be dedicated to the public regardless of whether the element or component is explicitly recited in the following claims.

What is claimed is:

1. A projection apparatus, comprising:
an illumination system, comprising:
a blue light emitting element, configured to emit a blue beam;
a red light emitting element, configured to emit a red beam;
a wavelength conversion device, comprising a reflection area and a wavelength conversion area, wherein the reflection area and the wavelength conversion area are located on a transmission path of the blue beam in time sequence, and the wavelength conversion area is configured to convert the blue beam into a green beam;
a dichroic assembly, disposed between the blue light emitting element and the wavelength conversion device;
a first light diffusing element, disposed between the red light emitting element and the dichroic assembly; and
a second light diffusing element, disposed on transmission paths of the blue beam, the red beam and the green beam from the dichroic assembly, the second light diffusing element having a diffusion area and a non-diffusion area, an angle of the non-diffusion area relative to a central axis of the second light diffusing element being greater than an angle of the diffusion area relative to the central axis of the second light diffusing element, the diffusion area being located on the transmission path of the blue beam, and the non-diffusion area being located on a transmission path of the green beam;
a prism assembly, disposed on transmission paths of the red beam, the green beam and the blue beam from the second light diffusing element, and having a dichroic film;
a first light valve, wherein the dichroic film is configured to transmit the red beam to the first light valve, and the first light valve is configured to convert the red beam into a first image beam;
a second light valve, wherein the dichroic film is configured to transmit the green beam and the blue beam to the second light valve, and the second light valve is configured to convert the green beam and the blue beam into a second image beam and a third image beam; and
a projection lens, disposed on a transmission path of an image beam, and configured to project the image beam out of the projection apparatus, wherein the image beam comprises at least one of the first image beam, the second image beam and the third image beam.

2. The projection apparatus according to claim 1, wherein an angle coverage of the wavelength conversion area relative to a central axis of the wavelength conversion device is 270 degrees to 306 degrees.

3. The projection apparatus according to claim 1, wherein the dichroic assembly comprises a first dichroic element and a second dichroic element, and the first dichroic element is disposed between the second dichroic element and the wavelength conversion device.

4. The projection apparatus according to claim 3, wherein the first dichroic element has a first area, a second area and a third area arranged in sequence, coating properties of the first area are the same as coating properties of the third area, and the coating properties of the first area are different from coating properties of the second area.

5. The projection apparatus according to claim 4, wherein the first area and the third area are configured to allow the blue beam and the red beam to pass through and reflect the green beam, the second area is configured to allow the red beam to pass through and reflect the blue beam and the green beam, the second area and the third area are located on a transmission path of the blue beam from the reflection area of the wavelength conversion device, and an area ratio between the second area and the third area is 1:1.

6. The projection apparatus according to claim 3, wherein the second dichroic element is configured to allow the red beam to pass through and reflect the blue beam.

7. The projection apparatus according to claim 3, wherein the red beam emitted by the red light emitting element is transmitted to the first light diffusing element, the second dichroic element, the first dichroic element and the second light diffusing element in sequence.

8. The projection apparatus according to claim 7, wherein the red beam passes through the diffusion area and the non-diffusion area of the second light diffusing element in time sequence.

9. The projection apparatus according to claim 1, wherein the first light diffusing element has a diffusion area.

10. The projection apparatus according to claim 1, wherein a sum of the angle of the diffusion area relative to the central axis of the second light diffusing element and the angle of the non-diffusion area relative to the central axis of the second light diffusing element is 360 degrees.

11. The projection apparatus according to claim 1, wherein the non-diffusion area comprises a reflection layer, which is configured to reflect the blue beam.

12. The projection apparatus according to claim 1, wherein in a first time interval, the green beam passes through the non-diffusion area of the second light diffusing element, and in a second time interval, the blue beam passes through the diffusion area of the second light diffusing element.

13. The projection apparatus according to claim 1, wherein in a first time interval, the red beam and the green beam are transmitted to the first light valve and the second light valve respectively, and in a second time interval, the red beam and the blue beam are transmitted to the first light valve and the second light valve respectively.

14. The projection apparatus according to claim 13, wherein a ratio between the first time interval and the second time interval is 75:25 to 85:15.

15. The projection apparatus according to claim 1, wherein a time length of the red beam entering the first light valve is equal to a sum of a time length of the green beam entering the second light valve and a time length of the blue beam entering the second light valve.

16. The projection apparatus according to claim 1, wherein the dichroic film is configured to allow the red beam to pass through and be transmitted to the first light valve, and is configured to reflect the green beam and the blue beam to the second light valve.

17. The projection apparatus according to claim 1, wherein a peak of a spectrum of the green beam falls within a range of 515 nanometers (nm) to 535 nm.

18. The projection apparatus according to claim 1, wherein a reflection band of the blue beam reflected by the non-diffusion area comprises a range of 450 nm to 460 nm.

* * * * *